Figure 1:
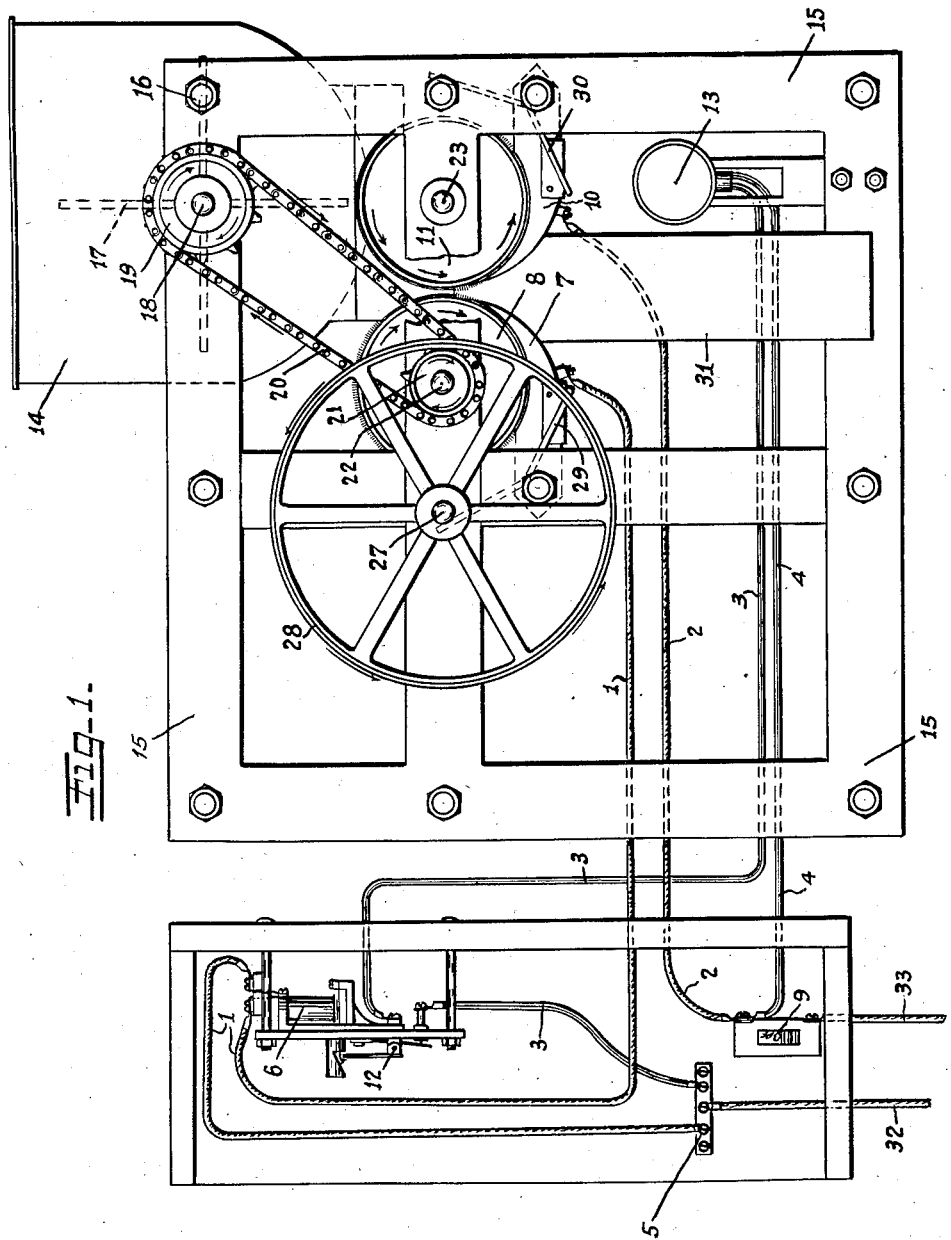

May 28, 1935. R. E. McDONALD 2,002,745
MACHINE AND METHOD FOR DETECTING PINK BOLLWORM IN COTTON SEED
Filed Oct. 14, 1932  3 Sheets-Sheet 1

Robert E. McDonald
Inventor

By C. M. Boyle
Attorney

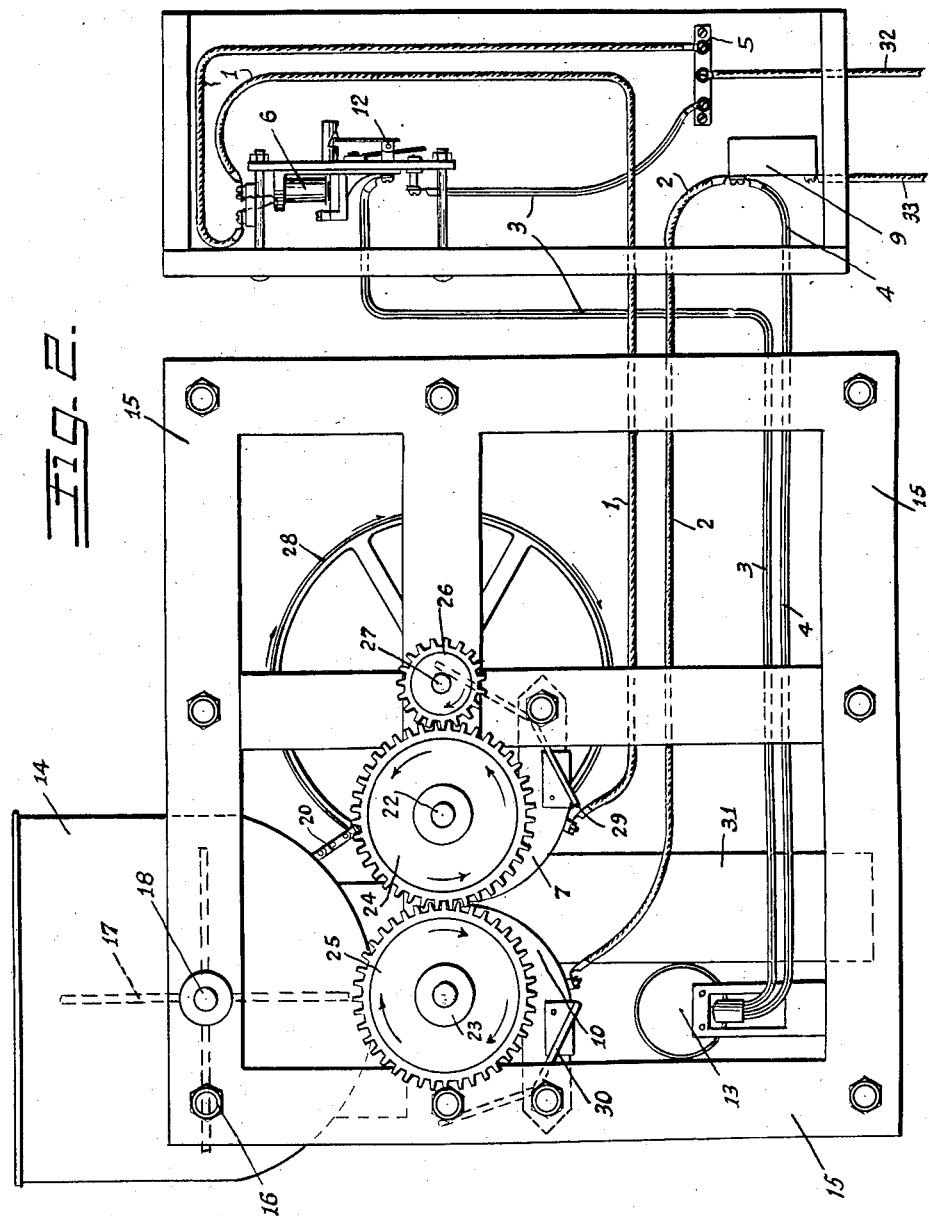

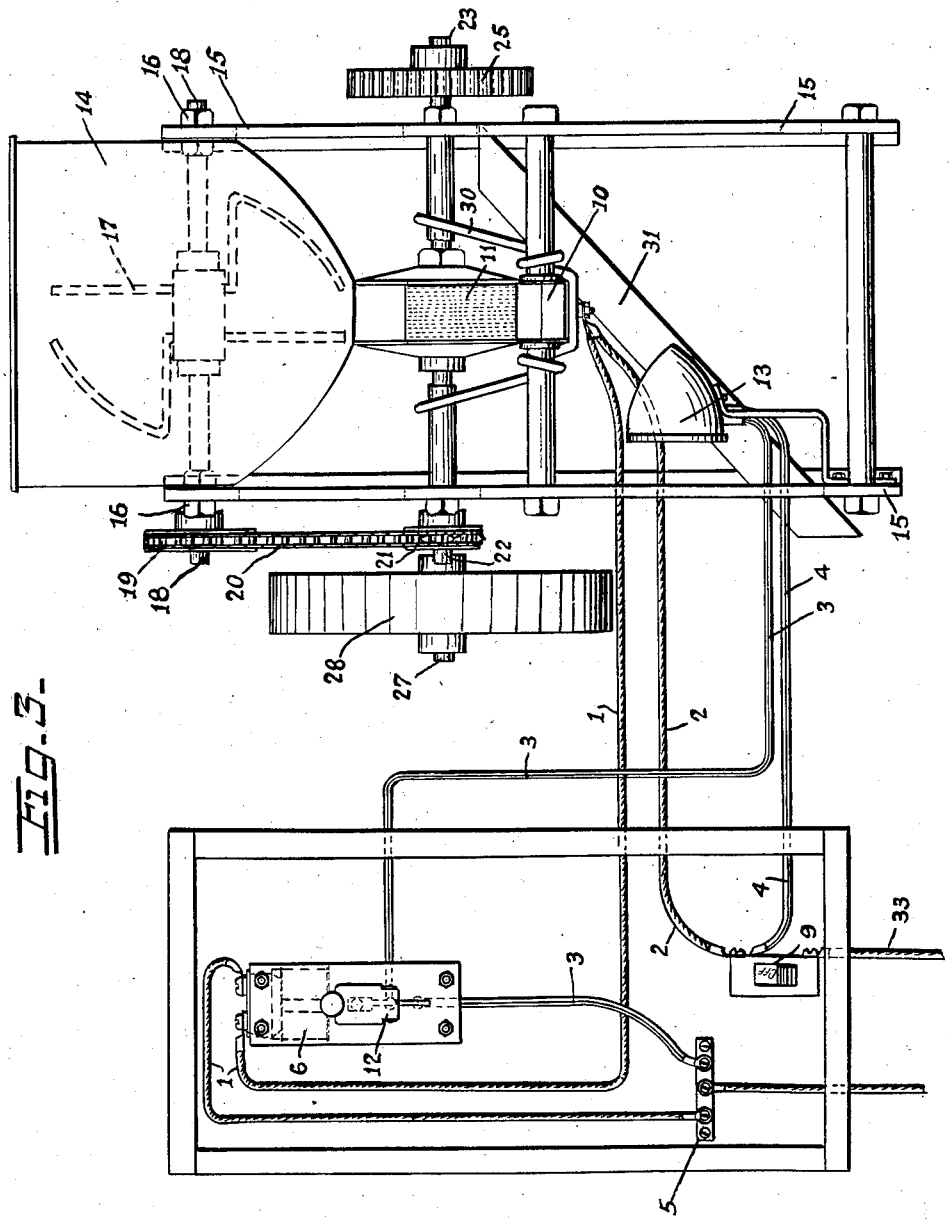

Patented May 28, 1935

2,002,745

UNITED STATES PATENT OFFICE 2,002,745

MACHINE AND METHOD FOR DETECTING PINK BOLLWORM IN COTTON SEED

Robert E. McDonald, San Antonio, Tex.; dedicated to the free use of the Public

Application October 14, 1932, Serial No. 637,802

2 Claims. (Cl. 177—311)

(Granted under the act of March 3, 1883, as amended April 30, 1928; 370 O. G. 757)

This application is made under the act approved March 3, 1883, as amended by the act of April 30, 1928; and the invention herein described, if patented, may be manufactured and used by or for the Government for governmental purposes without the payment to me of any royalty thereon.

I hereby dedicate the invention herein described to the free use of the public, in the territory of the United States, to take effect upon the granting of a patent to me.

Cotton seed is the natural home of the pink bollworm, a serious cotton pest; and this insect is largely disseminated by seed movements.

Heretofore, in the examination of cotton seed for infestation of the pink bollworm, it was necessary that each seed be cut, which, in practice, was done with a pocket knife, such method requiring considerable time and care to perform. With the use of my machine hereinafter described, this determination can be made at an appreciable saving of men and expense.

In inspecting cotton seed for the pink bollworm by the pocket knife method, an inspector can examine an average of about 4800 cotton seed per 8 hour day; whereas, my machine, which is equipped to handle 4 units of cotton seed in uninterrupted movement, is capable of handling in the same period, approximately 384,000 cotton seed and determining the presence of any pink bollworm therein. As used in the above connection, a unit of uninterrupted movement is a row of continuously moving cottonseed passing through the machine. The movement of seed through this machine is uninterrupted in so far as mechanical operation of the machine itself is concerned. It may be operated for several working days or for an indefinite period without stopping, if the seed being handled contain no pink bollworm. Any interruption occurs only when the machine detects the pink bollworm in the seed and the operator stops the machine to remove the infested seed, with the few accompanying non-infested seed, into a container provided. Therefore, one man with my machine can do the work of 80 men without it; and the efficiency of my machine, which can be constructed to any desired size, will be increased in proportion to its seed handling capacity.

My invention can be performed by a machine which consists essentially of two cylinders revolving in uniformity and horizontally opposite in position to each other, the circumferences of which are firmly set with sharp pointed metal spikes, contacted by slotted arms or brushes when supplied with an alternating electric current through suitable wiring arrangement.

I attain the objects of my invention by the mechanism illustrated in the accompanying drawings, in which Figures 1 and 2 are side views and 3 is an end view.

Similar numerals refer to similar parts throughout the several views.

In operation the cottonseed to be examined is deposited by the operator into the elevated hopper 14 attached to frame 15 by bolts 16 and fall onto 4-armed stirring device 17, attached to shaft 18 driven by 10-toothed sprocket wheel 19, by roller chain 20 over 7-toothed drive sprocket wheel 21, which loosens the bulk of the cottonseed at the bottom of hopper 14 by which agitation, together with the force of gravitation, the seed is deposited between and are contacted by the sharply pointed spikes of the opposed revolving cylinders 8 and 11, attached to shafts 22, and 23, operated by 40-toothed cog wheels 24 and 25 and driven by 19-toothed cog wheel 26, attached to drive shaft 27, driven by belt (not shown) over pulley 28, by suitable power (not shown). Continuing on their course the cottonseed are carried between the said spikes which are firmly held and separated $\frac{1}{16}$ inch on the circumferences of the said revolving cylinders 8 and 11 and the seed are penetrated to a sufficient depth from opposite sides to contact any pink bollworm within the seed when the said spikes of the said cylinders 8 and 11, revolving in unison, come within $\frac{3}{32}$ inch of each other. Continuing the cottonseed is removed from said spikes by slotted arms 7 and 10, contacting said cylinders and held in place by springs 29 and 30, and fall through chute 31 onto the platform (not shown) on which the machine rests, from which they are immediately removed by the operator and put into suitable containers (not shown) provided for infested and non-infested seed. The operation of the machine, which is a very compact apparatus, is closely watched by the operator, who stops the machine instantly when it signals, by means hereinafter described, the detection of the pink bollworm in the seed, and the infested seed, together with the few accompanying non-infested seed, is removed by hand from the platform and deposited in container provided for that purpose, for individual examination and removal of the pink bollworm, after which they are destroyed. While the machine is stopped at the signal, the infested seed causing the signal will have been removed from the spikes by the arms 7 and 10 and deposited under the chute on the platform.

The electric wiring system of this machine is designed to operate on 110 volt alternating current, the necessary wiring being mounted on and leading from a panel attached to a frame 15 of the machine by suitable means (not shown).

Line 1 is supplied by current from drop cord 32 through terminal 5 and continuing passes through the windings of magnet coil 6 to slotted insulated arm 7, contacting with revolving insulated cylinder 8.

Line 2 is supplied by current from drop cord 33 through snap switch 9, to slotted insulated arm 10 contacting with revolving insulated cylinder 11.

Line 3 is supplied by current from drop cord 32 through terminal 5 and continues through drop switch 12 to incandescent lamp 13.

Line 4 is supplied by current from drop cord 33 through snap switch 9 to incandescent lamp 13.

The function of electric current 1 and 2 in the process is that when cotton seed containing pink bollworms are passed between and are pierced by the spikes of revolving insulated cylinders 8 and 11, conductivity is given to and closes the circuit, thereby causing magnet coil 6 to operate on and release drop switch 12, closing the circuit on line 3 and 4.

The function of electric current lines 3 and 4 is that when the circuit of line 1 and 2 is closed by the conductivity of the pink bollworm in the cotton seed, magnet coil 6 is caused to operate and release drop switch 12, thereby closing circuit of lines 3 and 4, causing the lamp 13 to burn and signal the presence of the pink bollworm. When seed containing pink bollworm have cleared the spikes of cylinders 8 and 11 the circuit of lines 1 and 2 is opened and incandescent light instantaneously ceases to function.

The seed is handled through the machine singly, in 4 units or rows of uninterrupted movement, as heretofore explained, except when the pink bollworm is detected in the seed. This causes light 13 to burn, upon which signal the operator stops the machine and immediately removes the infested seed, including the few non-infested seed accumulated beneath chute 31 on the platform heretofore mentioned, onto which they have fallen, and the machine is again set in operation and continues until it is again stopped for a like result. The few seed thus taken are destroyed after all the pink bollworms have been removed therefrom. The worms are retained in a killing preservative for further and complete identification and record. The volume of uninfested seed passing through the machine (which also falls through chute 31 onto platform, heretofore mentioned, is constantly removed by the operator into a container provided for that purpose) is left uninjured for further processing and manufacture of by-products at oil mills; whereas all seed inspected by the pocket knife method is cut into many pieces and its further utilization is lost. It is obvious that the invention is not a control measure; its operation and purpose is to discover and not to eradicate the pink bollworm. The finding of pink bollworm in cottonseed is good evidence that other pink bollworm exist in the cotton field or fields in the community in which the seed was produced. The function of the invention is to bring such evidence to light, if present, or to negatively show its absence. It is upon discovery of infestation of the pink bollworm that the Federal quarantine and its extension is based, under which well known effective control measures are carried out with good hope of eradication if the infestation is discovered in its incipiency, and it is upon determination of eradication of the insect in areas that quarantine restrictions are released. The invention also has a negative value. If no pink bollworm are found in the seed from the locality under investigation but not under regulations, it is evidence that the community is free of infestation of the insect, and this information is not only valuable assurance to the cotton growers of that section, but enables the government to direct its investigation to other areas, thereby making it possible to cover a considerable portion of the cotton belt.

Having fully disclosed my discovery I claim as my invention:

1. In a device for detecting the presence of bollworms in cotton seed, the combination of a pair of electric current conducting empaling means, means for moving said empaling means into opposed registering relation out of contact but spaced apart less than the diameter of a cotton seed, means for positioning a cotton seed between said empaling means for empalement thereby, an electrically operated indicating device, a source of electric energy electrically connected with said empaling means and indicating device in such a manner as to operate said indicating device upon establishment of an electrical communication between said empaling means.

2. A machine for detecting the presence of pink bollworms in cotton seed comprising a frame, a hopper rigidly attached to said frame, a rotatable stirring device located within the hopper, two revolvable cylinders journaled within said frame and having a plurality of pointed metal spikes attached to and extending outwardly from the circumferences thereof and positioned to receive the cotton seed discharged from the bottom of said hopper, the cylinders being located in such proximity to each other that the adjacent spikes will be spaced horizontally a distance less than the diameter of a cotton seed, means to agitate said stirring device and revolve said cylinders, means to remove empaled cotton seed from said spikes, a lamp, a source of electrical energy, current conducting means connecting said lamp, source of energy and cylinders in such a manner that upon simultaneous contact of a bollworm in a cotton seed with spikes on both cylinders a circuit will be completed through said bollworm, source of energy and lamp to light said lamp.

ROBERT E. McDONALD.